United States Patent
Wilkinson et al.

(10) Patent No.: US 7,228,639 B2
(45) Date of Patent: Jun. 12, 2007

(54) INVERT MEASURING DEVICE

(75) Inventors: John Wilkinson, Phoenixville, PA (US); Edward Wilkinson, Spring City, PA (US); Richard Yandrick, Sellersville, PA (US)

(73) Assignee: Wilkinson & Associates, Inc., Valley Forge, PA (US)

( * ) Notice: Subject to any disclaimer, the term of this patent is extended or adjusted under 35 U.S.C. 154(b) by 0 days.

(21) Appl. No.: 11/346,615

(22) Filed: Feb. 2, 2006

(65) Prior Publication Data

US 2007/0022617 A1      Feb. 1, 2007

Related U.S. Application Data

(60) Provisional application No. 60/651,185, filed on Feb. 9, 2005.

(51) Int. Cl.
*G01B 5/18* (2006.01)
*G01B 5/08* (2006.01)

(52) U.S. Cl. .......................................... 33/542; 33/1 H
(58) Field of Classification Search ................ 33/293, 33/403, 452, 464, 482, 483, 529, 542, 544, 33/1 H
See application file for complete search history.

(56) References Cited

U.S. PATENT DOCUMENTS

| | | | | |
|---|---|---|---|---|
| 667,516 A | * | 2/1901 | Gibboney, Jr. ................ | 33/544 |
| 1,858,544 A | * | 5/1932 | Erickson ...................... | 33/544 |
| 3,995,373 A | * | 12/1976 | Brumbelow .................. | 33/542 |
| 5,309,644 A | * | 5/1994 | Robinson et al. ............. | 33/293 |
| 2003/0226272 A1 | * | 12/2003 | Finefield ...................... | 33/542 |
| 2005/0005467 A1 | * | 1/2005 | Hannel ......................... | 33/542 |
| 2006/0283030 A1 | * | 12/2006 | Lee .............................. | 33/293 |

* cited by examiner

*Primary Examiner*—G. Bradley Bennett
(74) *Attorney, Agent, or Firm*—Charles N. Quinn

(57) ABSTRACT

A measuring device for obtaining inlet invert measurements, pipe invert measurements, and pipe diameter measurements includes an invert measuring rod having a plurality of rod segments, each a threaded bore at a first end and an axially extending threaded stud at a second end, a foot assembly comprising a guide rod removably connected to and extending perpendicularly from the bottom of the lower segment of the continuous rod, when connected having a free end opposite the connecting with the invert measuring rod with a bottom conical foot connected to and extending downwardly from the free end of the guide rod and parallel to the invert measuring rod, the bottom conical foot having an axial length the same as axial length of the conical rod tip, and extending from the free end of the guide rod parallel to the invert measuring rod and a diameter measuring sleeve, having a tubular portion positionable concentrically about the invert measuring rod and having an inner diameter just greater than the outer diameter of the invert measuring rod to create a friction fit therebetween permitting sliding movement of the tubular portion along the length of the invert measuring rod to a selected position and retaining the tubular portion at the selected position on the rod with a measurement scale disposed lengthwise on the tubular portion with numerical indicators of measure increasing from the collar to the bottom of the tubular portion.

1 Claim, 9 Drawing Sheets

INVERT MEASURING DEVICE

CROSS REFERENCE TO RELATED PATENT APPLICATION

This patent application claims the benefit under 35 USC 119 of the filing date of U.S. provisional application Ser. No. 60/651,185, filed 9 Feb. 2005 in the names of John Wilkinson, Ed Wilkinson and Richard Yandrick. The disclosure of provisional application Ser. No. 60/651,185 is hereby incorporated by reference.

BACKGROUND OF THE INVENTION

1. Field of Invention

The invention relates to a measuring device having an invert measuring rod and a diameter measuring sleeve, for obtaining inlet invert measurements, pipe invert measurements, and pipe diameter measurements.

2. Description of the Related Art

Professionals in land surveying, municipal maintenance, and related industries often must obtain depth measurements of inlets, manholes, and other subsurface structures. Surveying professionals also often must obtain depth and diameter measurements of underground pipes leading to and from subterranean inlets or other subsurface structures. Surveying professionals refer to these depth measurements as "bottom elevation" measurements or, as used herein, "invert" measurements.

There are various methods and apparatus known for taking inlet invert measurements, pipe invert measurements, and pipe diameter measurements. For example, surveying professionals may physically enter an inlet to obtain inlet invert measurements, pipe invert measurements, and pipe diameter measurements. However, physically entering an inlet, such as a public sewer that might be covered by a manhole cover, or other subsurface structure, can be time consuming, cumbersome, and dangerous.

Another method to obtain an invert measurement includes dropping a tape measure or a staff-type device into an inlet. Yet another approach is to peer into the inlet from ground level, using a flashlight to locate an underground pipe and then to estimate visually the size of the underground pipe relative to a tape measure or a staff-type device.

SUMMARY OF THE INVENTION

In one of its aspects this invention provides a measuring device including an invert measuring rod, a foot assembly extending perpendicularly from the bottom of the invert measuring rod, and a diameter measuring sleeve positioned concentrically about the invert measuring rod. Surveying professionals can use the invert measuring rod, with or without the diameter measuring sleeve, to obtain inlet invert measurements and pipe invert measurements. Surveying professionals can also use the invert measuring rod, in conjunction with the diameter measuring sleeve, to obtain subterranean pipe diameter measurements.

The invert measuring rod of the measuring device preferably includes a plurality of rod segments attached one to another to define a solid, rigid, continuous rod. Each rod segment preferably includes a threaded bore at a first end and a threaded stud extending from a second end. The threaded bores and threaded studs of adjacent rod segments are threadedly engagable to form joints for removably connecting adjacent rod segments one to another. One segment of the invert measuring rod, adapted to define a lower end of the measuring rod, preferably includes a conical tip extending downwardly from the rod segment at the lower end of the invert measuring rod. The gradations and associated numbers defining the scale may be either in English units or metric units. If the scale gradations and numbers are in English units, it is preferable that the gradations be spaced one-eighth inch one from another and that gradations at the quarter inch, one-half inch and one inch position be longer than those at the one-eighth inch positions. Also, it is desirable that the numbers, such as indicating one inch, be at the inch positions on the scale. If desired the gradations may be more finely spaced or may be spaced further apart, for example one-quarter inch apart. Similarly, if the scale is in the metric system, it is desirable that the gradations be one centimeter apart with numbers appearing at the one meter and perhaps at the one decimeter positions. However, it is permissible to have the gradations on the scale one millimeter apart if desired. As with the English system approach mentioned above, in the metric system approach it is desirable to have the gradations associated with the centimeter position each being successively longer so as to indicate graphically a greater distance measure than the distance indicated by the smallest one of the gradations chosen for the scale.

The invert measuring rod preferably also includes at least one measuring scale, having scale gradations with associated numbers. Sections of the scale are positioned lengthwise and are imprinted or embossed on rod segments to form the measuring rod scale when the rod segments are connected to one another. The resulting scale, made of sections with gradations that are numbered consecutively, has numbers that preferably increase from the bottom to the top of the invert measuring rod.

The measuring device also includes a removable foot support assembly including a guide rod, a bottom conically shaped foot, and a top conically shaped foot. The guide rod extends transversely from the bottom segment of the assembled invert measuring rod, and includes a free end remote from the point of connection with the invert measuring rod. The bottom conical foot preferably extends downwardly from the free end of the guide rod, with an axis parallel to the invert measuring rod. The top conical foot preferably extends upwardly from the free end of the guide rod with an axis parallel to the invert measuring rod. The guide rod is preferably removable from the bottom segment of the assembled invert measuring rod. Preferably the guide rod threadedly engages a tap toll in the bottom segment of the invert measuring rod. It is also permissible to have a slidable, in-and-out fit of the guide rod into a receptacle formed in the bottom segment of the invert measuring rod.

The top and bottom conical feet are mounted on the guide rod and preferably secured thereto by bolts, adhesives or other suitable retaining means. The conical feet may preferably be metal or plastic. Desirably the material for the conical feet is selected so as to provide ease of connection of the conical feet with the guide rod.

The measuring device preferably also includes a measuring sleeve that is dimensioned to fit concentrically about the invert measuring rod. The measuring sleeve preferably has inner diameter just greater than the outer diameter of the invert measuring rod, to provide a slidable friction fit therebetween, permitting a surveying professional to slide the diameter measuring sleeve along the invert measuring rod to a selected position and have the measuring sleeve remain at the selected portion on the rod. The measuring sleeve preferably includes a collar extending radically outwardly from the top of the sleeve. The measuring sleeve preferably also includes a graduated measuring scale extending lengthwise along the sleeve with numbers running from lower to higher along the sleeve, running downwardly from the collar towards the bottom of the sleeve.

In one method aspect of the invention, a surveying professional preferably uses the measuring device to obtain an inlet invert measurement by (1) passing the measuring device through an inlet entrance, (2) lowering the measuring device through the inlet until the conical rod tip touches the bottom of the inlet, and (3) reading a point, on the printed rod scale, which is aligned with the inlet entrance.

In a second method aspect of the invention, a surveying professional preferably uses the measuring device to obtain a pipe invert measurement by (1) passing the measuring device, with the foot assembly attached, through an inlet entrance, (2) lowering the measuring device through the inlet, with the free end of the guide rod and foot assembly following a sidewall of the inlet, until the free end of the foot assembly passes into a transversely oriented underground pipe, (3) resting the tip of the bottom conical foot on the bottom of the inside surface of the transversely oriented underground pipe, and (4) reading a point along the printed guide rod scale aligned with the inlet entrance into the underground pipe.

In yet another method aspect of the invention, a surveying professional uses the measuring device to obtain a pipe diameter measurement by (1) passing the measuring assembly with the foot assembly attached through an inlet entrance to a subterranean area, (2) lowering the measuring device through the inlet with the free end of the guide rod following a sidewall of the inlet to the subterranean area until the free end passes into a transverse underground pipe, (3) resting the tip of the bottom conical foot on the bottom of the inside surface of the somewhat transverse underground pipe, (4) sliding the diameter measuring sleeve downwardly about the invert measuring rod until the collar is aligned with the inlet entrance, (5) pulling the measuring device upward until the tip of the top conical foot makes contact with the top of the inside surface of the underground pipe while maintaining the diameter measuring sleeve stationary, and (6) reading the point along the printed sleeve scale aligned with the inlet entrance.

DETAILED DESCRIPTION OF THE INVENTION

Figure 1:
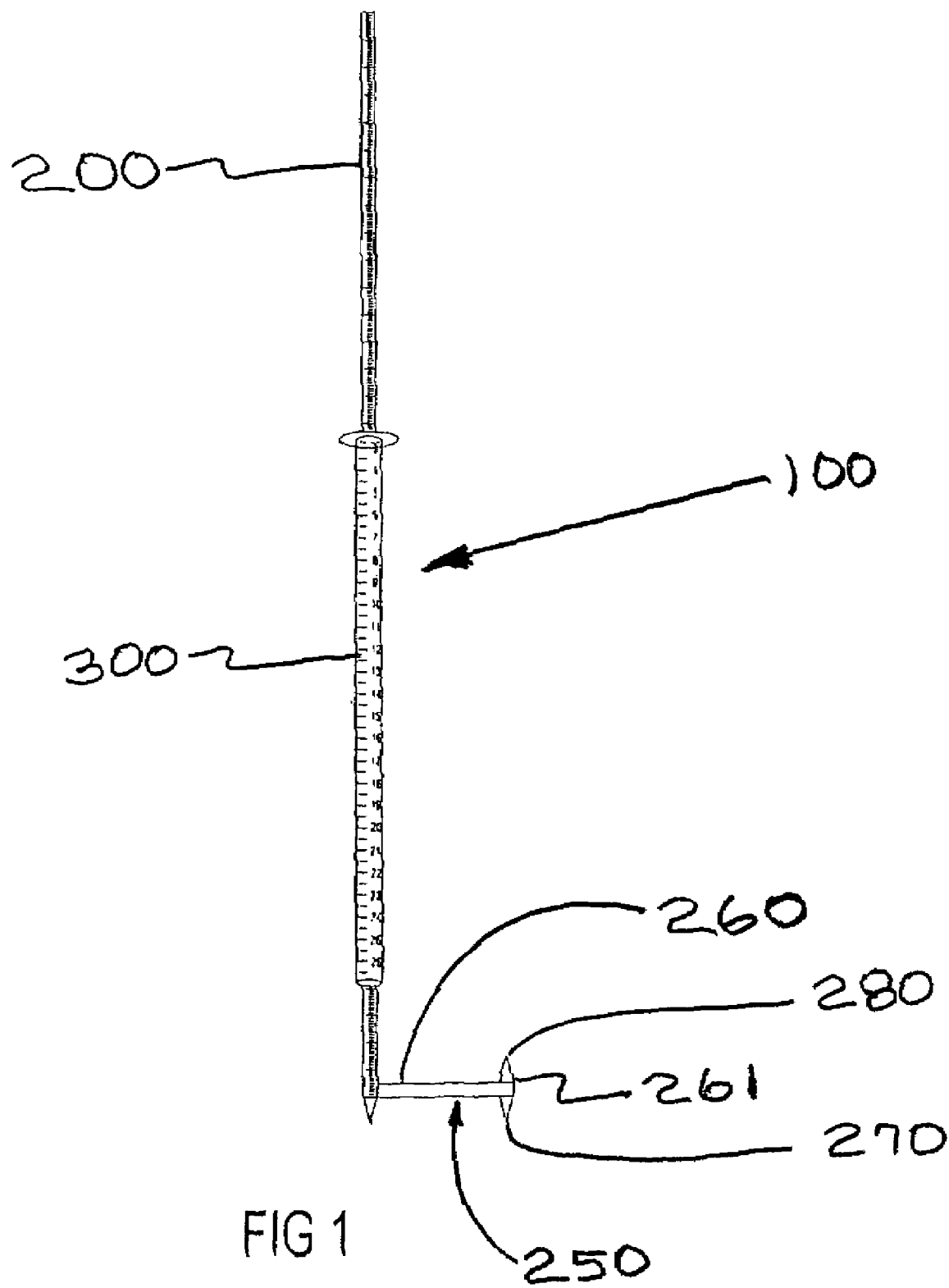
FIG. 1 is a front elevation of a measuring device manifesting aspects of the invention, having an invert measuring rod, a foot assembly, and a diameter measuring sleeve.

Referring to FIG. 1, a preferred embodiment of the measuring device is shown and designated generally 100. Measuring device 100 preferably includes an invert measuring rod 200, a foot assembly 250, and a diameter measuring sleeve 300, each addressed below.

Figure 2A:
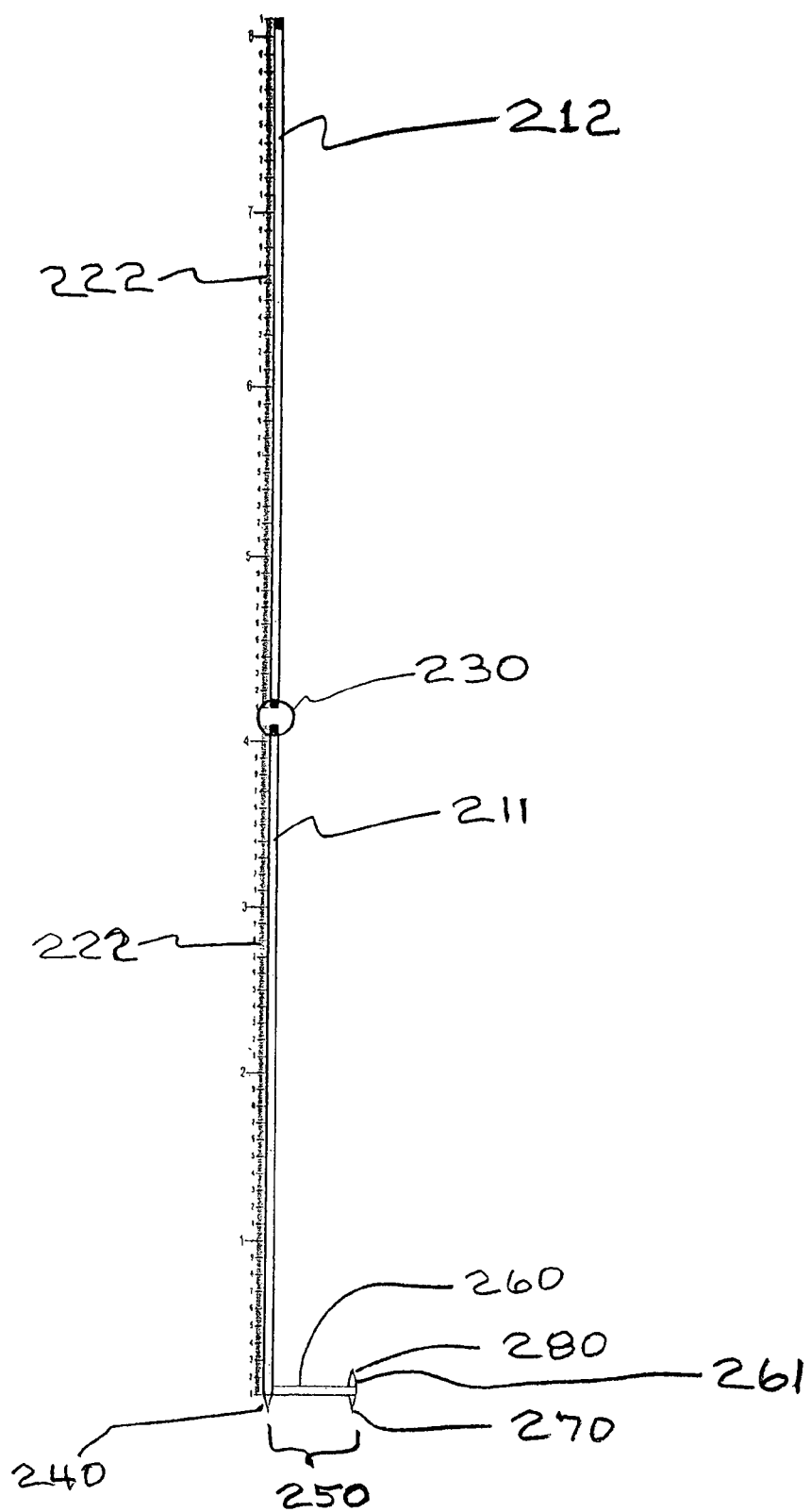
FIG. 2a is a partially-exploded front elevation of a measuring device manifesting aspects of the invention, having a foot assembly and an invert measuring rod ready to be formed of two separator rod segments, each with printed scale portions thereon.
Figure 2B:
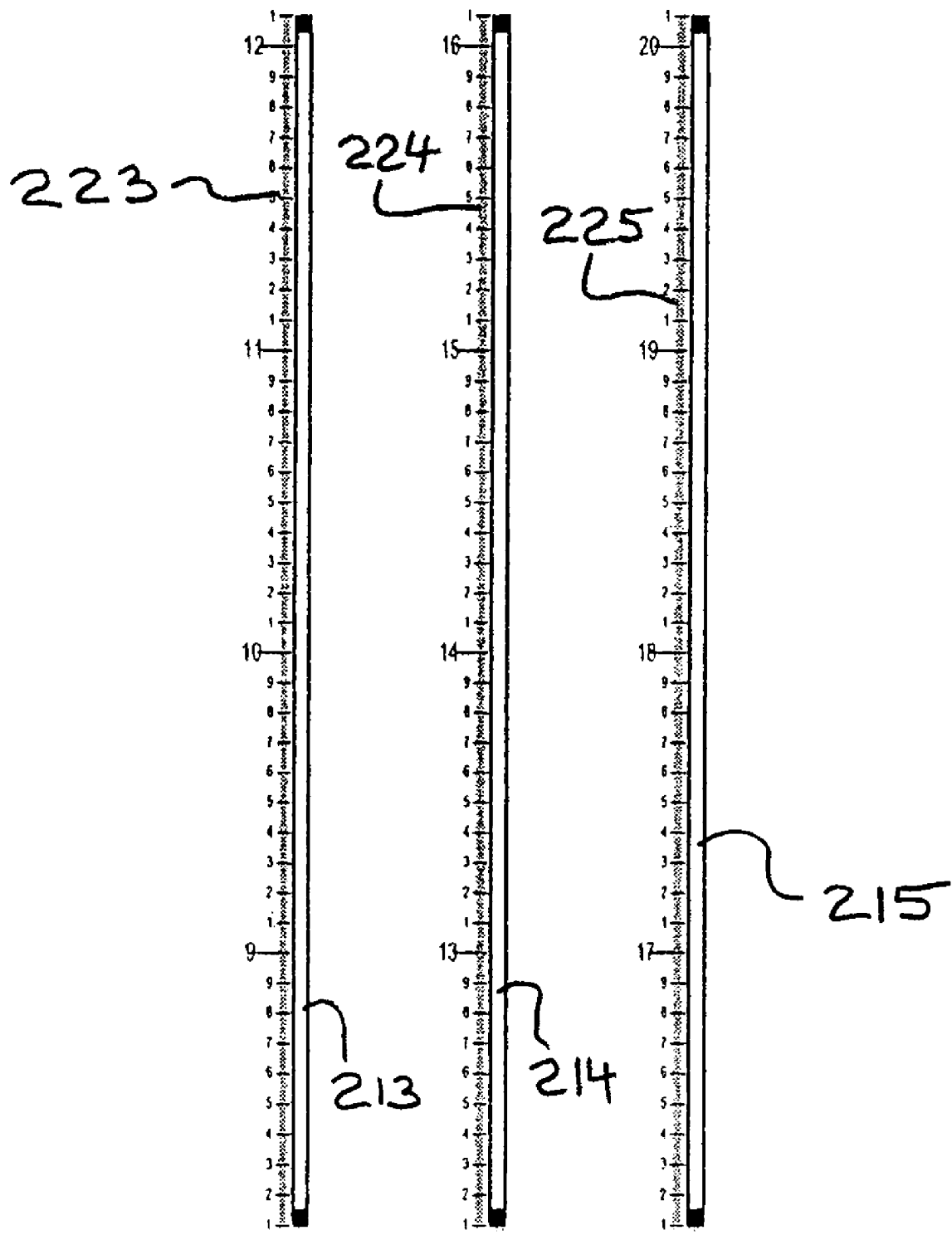
FIG. 2b is a front elevation of three rod segments with scale portions printed thereon.
Figure 2C:
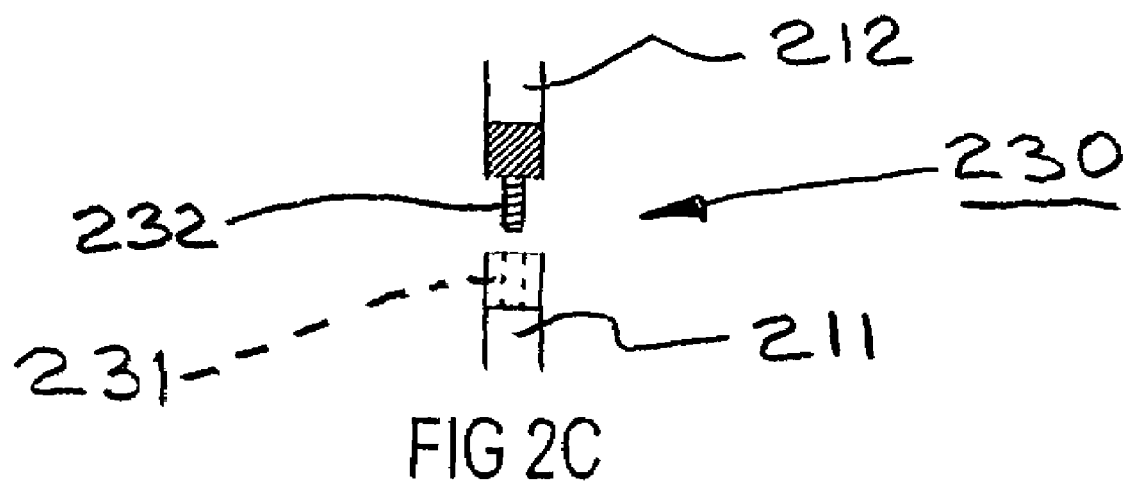
FIG. 2c is a broken front elevation of two rod segments showing a threaded bore and a threaded stud on respective segments for connecting adjacent rod segments.

Referring to FIGS. 2a through 2c, invert measuring rod 200 preferably includes rod segments 211 and 212, shown in FIG. 2a, and rod segments 213, 214, and 215, shown in FIG. 2b. Each of rod segments 211, 212, 213, 214, and 215 preferably includes a threaded bore 231 at a first end and an externally threaded stud 232 at a second end. As shown in FIG. 2c, threaded bores 231 and studs 232 of adjacent rod segments threadedly engage one another to form joints 230 removably connecting adjacent rod segments 211, 212, 213, 214, and 215 to one another. Invert measuring rod 200 preferably includes a conical rod tip 240, illustrated in FIG. 2A, extending downwardly from rod segment 211. Rod tip 240 defines the lower end of invert measuring rod 200 when in use. Five (5) rod segments are shown and described herein. Additional or fewer rod segments may be used.

The outer diameter of rod segments 211, 212, 213, 214, and 215 is preferably one-half (0.50) to three-quarters (0.75) of an inch. Whatever the choice of diameter for the rod segments, all of the rod segments are of the same outer diameter. The base diameter of conical rod tip 240 is preferably the same as the diameter of rod segment 211 from which tip 240 protrudes. The resulting uniform diameter of invert measuring rod 200 when the rod segments are assembled preferably permits surveying professionals to insert invert measuring rod 200 through the hole of a manhole cover and down into a manhole without having first to remove the manhole cover.

Invert measuring rod 200 preferably also includes a printed scale portion 221 on rod segment 211 and a printed scale portion 222 on rod segment 212, which are shown in FIG. 2a, and a printed scale portion 223 on rod segment 213, a printed scale portion 224 on rod segment 214, and a printed scale portion 225 on rod segment 215, all of which are shown in FIG. 2b. Scale portions 221, 222, 223, 224, and 225 form a printed scale on the assembled rod, with the assembled rod scale having gradations and numbers running consecutively and increasing from the lower extremity of invert measuring rod 200 defined by conical tip 240 to the top of invert measuring rod 200. Five (5) printed scale portions are shown and described herein; however, additional (or fewer) printed scale portions may be present according to whenever there are additional or fewer rod segments.

Each of printed scale portions 221, 222, 223, 224, and 225 preferably includes numbered marking gradations set apart by as little as one-tenth (0.1) of a foot or one-hundredth (0.01) of a meter, i.e. one (1.0) centimeter. Each one of printed scale portions 221, 222, 223, 224, and 225 preferably forms a four (4) foot length of the scale of the assembled invert measuring rod 200. The actual length of each rod segment 211, 212, 213, 214, 215 may be slightly greater than four (4) feet, as a result of additional length attributable to each threaded stud 232. However, each rod segment 211, 212, 213, 214, and 215 preferably has an effective measuring length of four (4) feet, because the additional length attributable to each threaded stud 232 of rod segments 211, 212, 213, 214, and 215 is within a threaded bore 231 of an adjacent rod segment 211, 212, 213, 214 or 215 when rod 200 is assembled.

The numbered gradations, defining the invert measuring rod scale formed by printed scale portions 221, 222, 223, 224, and 225 when rod segments 211, 212, 213, 214, 215 are assembled, preferably increase numerically from the lower extremity of invert measuring rod 200 to the upper extremity of invert measuring rod 200. As shown in FIGS. 2a through 2c, printed scale portions 221, 222, 223, 224, and 225 are positioned on rod segments 211, 212, 213, 214, and 215 as follows: printed scale portion 221 defines from zero (0) to four (4) feet on rod segment 211; printed scale portion 222 defines from four and one-tenth (4.1) to eight (8) feet on rod segment 212; printed scale portion 223 defines from eight and one-tenth (8.1) to twelve (12) feet on rod segment 213; printed scale portion 224 defines from twelve and one-tenth (12.1) to sixteen (16) feet on segment 214; and printed scale portion 225 defines from sixteen and one-tenth (16.1) to twenty (20) feet on rod segment 215.

Referring to FIGS. 1 and 2a, measuring device 100 preferably further includes a foot assembly 250 having a guide rod 260, a lower conical foot 270, and an upper conical foot 280. Guide rod 260 preferably extends perpendicularly from the lower extremity of rod segment 211 and includes a free end 261 opposite invert measuring rod 200. Lower conical foot 270 preferably extends downwardly from the free end of guide rod 260, with an axis that is parallel to invert measuring rod 200. The axial length of bottom conical foot 270 is preferably the same as the axial length of conical rod tip 240. Upper conical foot 280 preferably extends upwardly from the free end of guide rod 260 with an axis that is parallel to invert measuring rod 200. Guide rod 260 is preferably about one foot long and preferably is removable from the lower extremity of rod segment 211. Preferably guide rod 260 is externally threaded on one end, remote from the location of the conical feet 270, 280, and engages a tapped hole close to the lower extremity of rod segment 211. As a result, the guide rod 260 may be easily threadedly engaged with or disengaged from rod segment 211.

The tapered typical rod tip 240 forming the bottom of rod segment 211 is preferably about one-tenth foot in length. Similarly, upper and lower conical feet 280, 270 are also one-tenth of a foot in axial length so as to be the same length as the axial length of conical rod tip 240.

Figure 3:
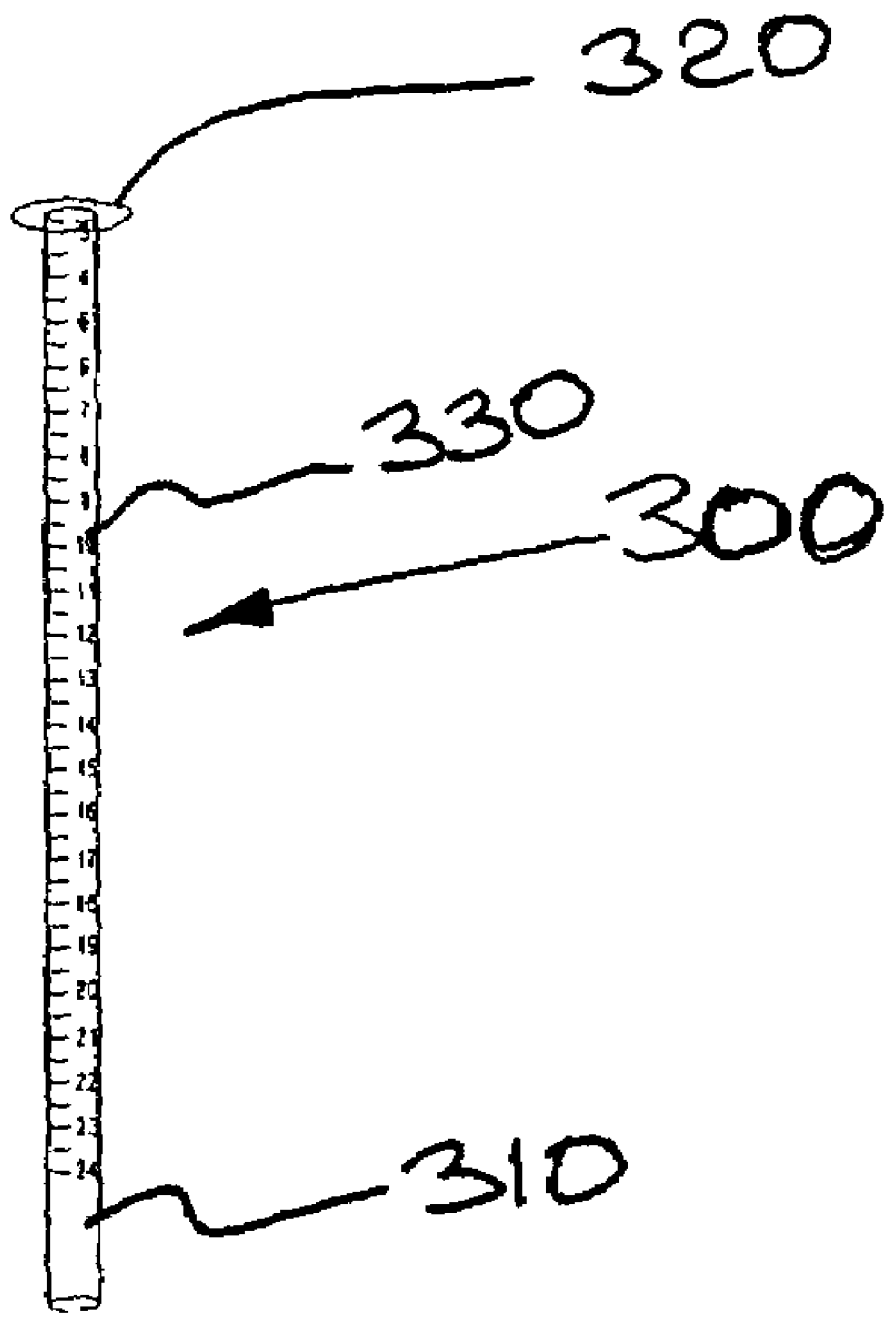
FIG. 3 is a front elevation of a diameter measuring sleeve manifesting aspects of the invention.

Referring to FIGS. 1 and 3, a diameter measuring sleeve is designated generally 300. Diameter measuring sleeve 300 preferably includes a tubular portion 310, a collar 320, and a printed sleeve scale 330. Tubular portion 310, being sized to fit concentrically about invert measuring rod 200, preferably has an inner diameter just greater than the outer diameter of invert measuring rod 200 to provide a hand-movable, slidable friction fit therebetween. A surveying professional can manually slide tubular portion 310 along the length of invert measuring rod 200 to a desired position; frictional engagement of tubular portion 310 about rod 200 then retains tubular portion 310 at the desired position on rod 200.

Tubular portion 310 is preferably flexible. Collar 320 preferably extends radically about the upper extremity of tubular portion 310. Printed scale 330, positioned lengthwise on tubular portion 310, has gradations defining scale distance by either tenths of a foot (as shown) or hundredths of a meter, corresponding to the gradations on invert measuring rod 200.

Diameter measuring sleeve may be split in construction to facilitate movement of the sleeve along the invert measuring rod. A longitudinal split of measuring sleeve 300 facilitates positioning of sleeve 300 around invert rod 200. Measuring sleeve 300 is preferably flexible plastic and may be typically 24 or 48 inches in length.

Measuring device 100 may be provided in unassembled form as a kit. A surveying professional may assemble and/or disassemble measuring device 100 on site with speed and ease. Measuring device 100 is preferably formed from lightweight material(s), such as carbon fiber, fiberglass, plastic, or other composite materials. A carrying case (not shown) may be provided for carrying the unassembled components of measuring device 100.

Figure 4:
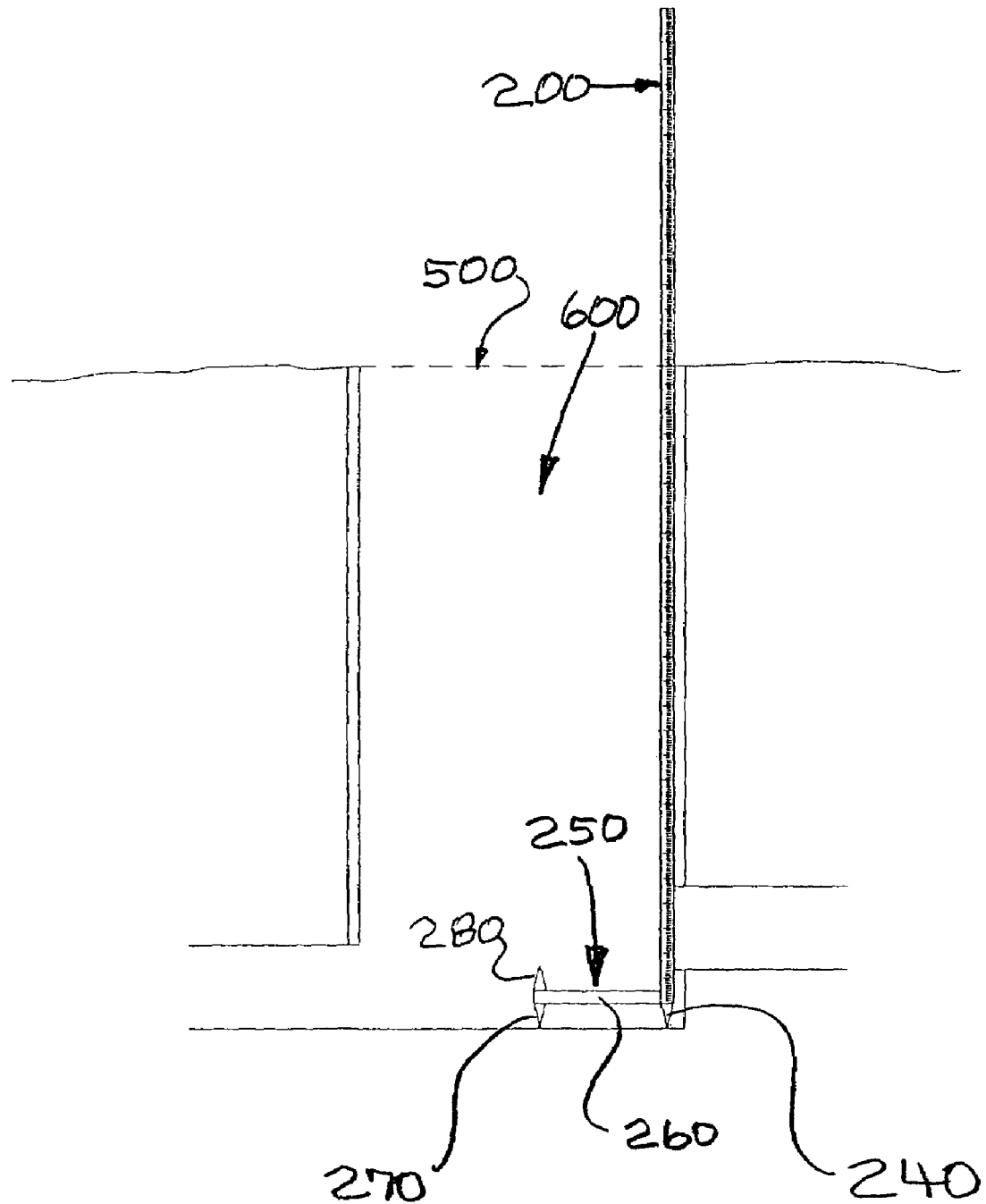
FIG. 4 is a partially broken schematic front elevation of a measuring device manifesting aspects of the invention in place within a subterranean inlet in the course of obtaining an inlet invert measurement, in accordance with a method aspect of the invention.

Referring to FIG. 4, use of measuring device 100 is shown in connection with a typical manhole-covered conduit designated 600. In the situation illustrated, measuring device 100 may be used to obtain inlet invert measurements, and diameter measuring sleeve 300 is not required. The situation illustrated does not require foot assembly 250; however, presence of foot assembly 250 is preferred.

In practice, a surveying professional passes measuring device 100 through an inlet opening 500 at ground level. The surveying professional then lowers invert measuring rod 200 until conical rod tip 240 (and bottom conical foot 270) touch bottom. To obtain the depth of the inlet, the surveying professional then reads the number, on the printed scale defined by the scale section 221, 222, 223, 224 or 225, that is associated with a scale gradation aligned with the inlet entrance, which is at ground level.

Figure 5:
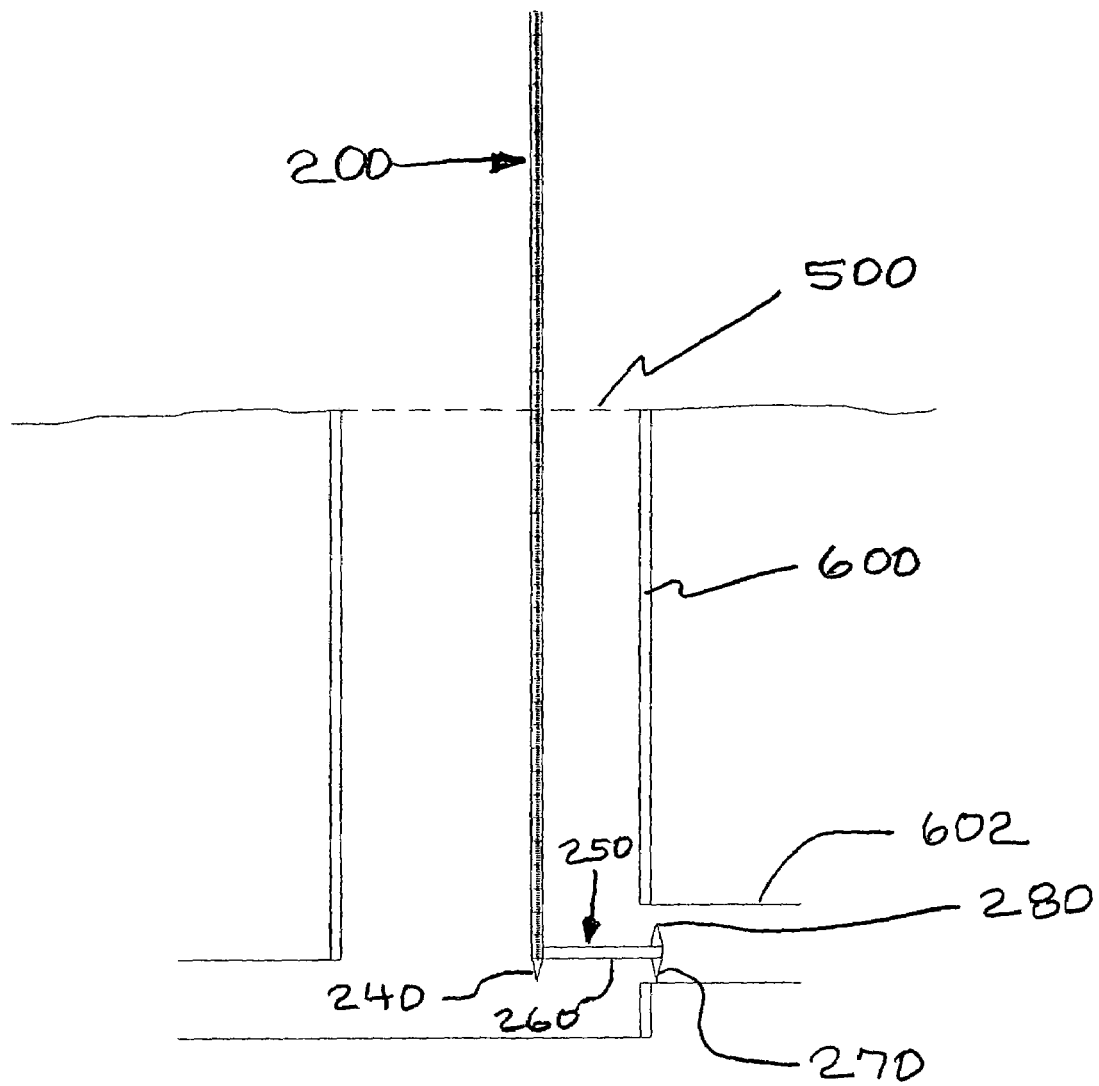
FIG. 5 is a partially broken schematic front elevation of a measuring device manifesting aspects of the invention in place within a subterranean inlet in the course of obtaining a lateral pipe invert measurement, in accordance with a method aspect of the invention.

FIG. 5 illustrates another use for measuring device 100. In the illustrated situation, diameter measuring sleeve 300 is not required. A surveying professional passes measuring device 100, including invert measuring rod 200 and foot assembly 250, through the inlet opening 500 at ground level. The surveying professional then lowers invert measuring rod 200 with the free end of guide rod 260, at which upper and lower conical feet 270 and 280 are located, following a sidewall of the conduit 600 until the free end of guide rod 260 finds an underground pipe 602 extending substantially transversely from conduit 600. The surveying professional rests the tip of bottom conical foot 270 on the bottom of the inside surface of underground pipe 602. To obtain the underground pipe location and diameter invent measurement, the surveying professional then reads points along the printed scale, defined by scale segments, 221, 222, 223, 224 or 225, which are aligned with the inlet entrance, as the surveying professional maneuvers invert measuring rod assembly so that the tip of lower conical foot 270 contacts the conduit 600 and then the bottom of underground pipe 602, and then the tip of upper conical foot contacts the top of underground pipe 602.

Figure 6A:
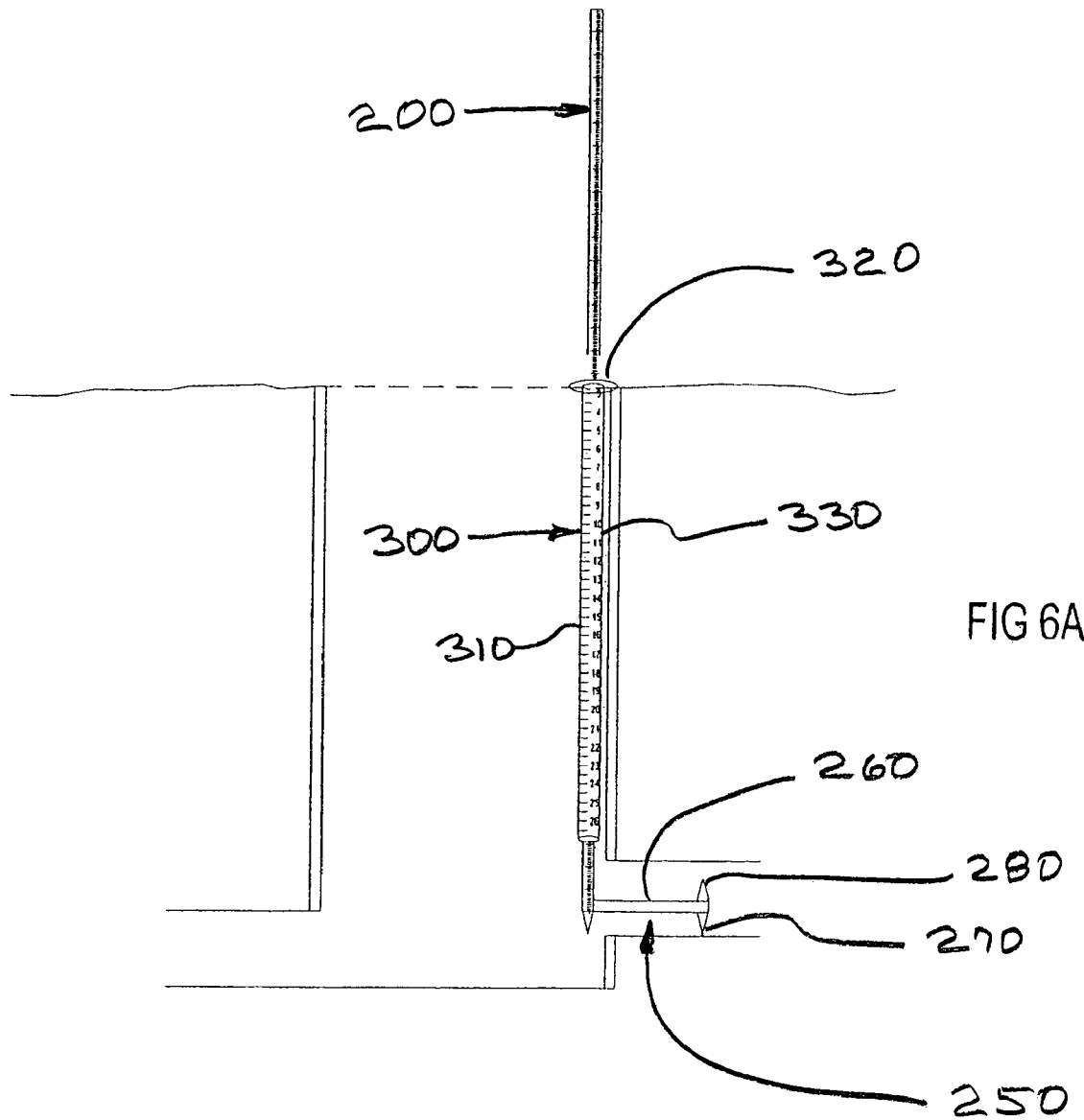
FIGS. 6a and 6b are partially broken schematic front elevations of a measuring device manifesting aspects of the invention in place within a subterranean inlet in the course of obtaining a measurement of the inner diameter of a pipe extending laterally from the inlet, in accordance with a method aspect of the invention.
Figure 6B:
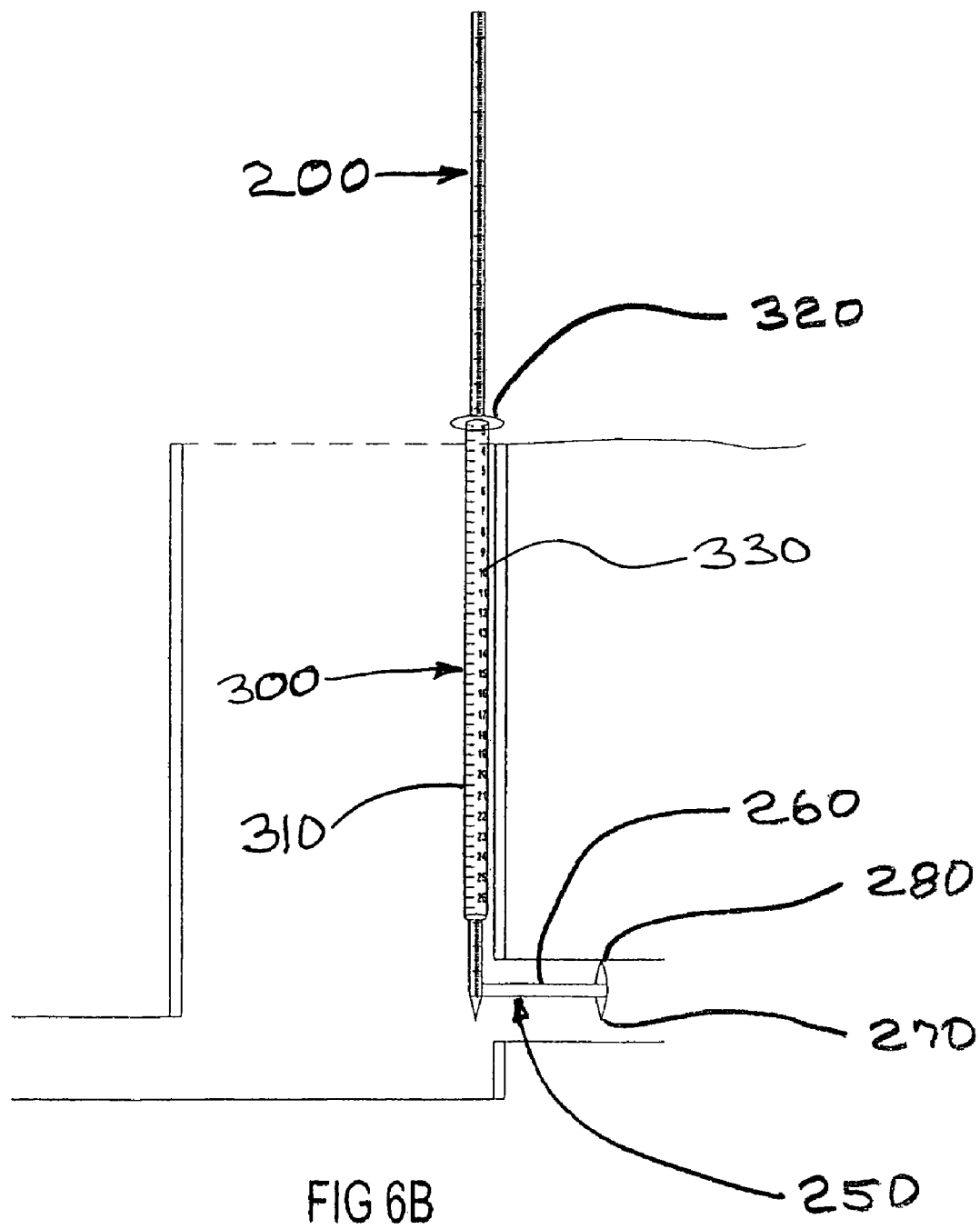

FIGS. 6a and 6b depict yet another use for measuring device 100, in which pipe diameter measurements are obtained using diameter measuring sleeve 300. The surveying professional rests the tip of bottom conical foot 270 on the bottom of the inside surface of the underground pipe 602 in the manner discussed above with reference to FIG. 5. As shown in FIG. 6a, the surveying professional then slides sleeve portion 310 downwardly over invert measuring rod

200 until collar 320 is aligned with the inlet entrance, 500 at ground level. As shown in FIG. 6*b*, the surveying professional then pulls invert measuring rod 200 upward until the surveying or maintenance professional encounters resistance due to contact between the tip of upper conical foot 280 and the top inside surface of underground pipe 602. To obtain the pipe diameter measurement, the surveying or maintenance professional reads the point on printed sleeve scale 330 that is then aligned with the inlet entrance.

What is claimed is:

1. A measuring device for obtaining inlet invert measurements, pipe invert measurements, and pipe diameter measurements, comprising:
  a. an invert measuring rod, comprising:
    i) a plurality of rod segments, each rod segment having a threaded bore at a first end and an axially extending threaded stud at a second end, the threaded bores and studs of adjacent rod segments when engaged and connecting adjacent rod segments one to another forming a continuous rod;
    ii) a plurality of scale portions disposed lengthwise on corresponding rod segments to define a rod scale with measurement indicators increasing from the bottom to the top of the continuous rod when the rod segments are assembled; and
    iii) a conical rod tip extending downwardly from the bottom of the lowermost segment of the continuous rod when assembled;
  b. a foot assembly, comprising:
    i) a guide rod removably connected to and extending perpendicularly from the bottom of the lower segment of the continuous rod, when connected having a free end opposite the connecting with the invert measuring rod;
    ii) a bottom conical foot connected to and extending downwardly from the free end of the guide rod and parallel to the invert measuring rod, the bottom conical foot having an axial length the same as axial length of the conical rod tip, and extending from the free end of the guide rod parallel to the invert measuring rod; and
    iii) a top conical foot connector to and extending upwardly from the free end of the guide rod, parallel to the invert measuring rod; and
  c. a diameter measuring sleeve, comprising:
    i) a tubular portion positionable concentrically about the invert measuring rod and having an inner diameter just greater than the outer diameter of the invert measuring rod to create a friction fit therebetween permitting sliding movement of the tubular portion along the length of the invert measuring rod to a selected position and retaining the tubular portion at the selected position on the rod; and
    ii) a measurement scale disposed lengthwise on the tubular portion with numerical indicators of measure increasing from the collar to the bottom of the tubular portion.

* * * * *